(12) United States Patent
Ng

(10) Patent No.: US 7,646,596 B2
(45) Date of Patent: Jan. 12, 2010

(54) TEST CARRIERS FOR STORAGE DEVICES

(75) Inventor: Bee Keong Ng, Singapore (SG)

(73) Assignee: Innovative Polymers Pte. Ltd., Singapore (SG)

( * ) Notice: Subject to any disclaimer, the term of this patent is extended or adjusted under 35 U.S.C. 154(b) by 150 days.

(21) Appl. No.: 10/597,074

(22) PCT Filed: Apr. 26, 2005

(86) PCT No.: PCT/SG2005/000132

§ 371 (c)(1),
(2), (4) Date: Jul. 10, 2006

(87) PCT Pub. No.: WO2006/115465

PCT Pub. Date: Nov. 2, 2006

(65) Prior Publication Data

US 2009/0190299 A1    Jul. 30, 2009

(51) Int. Cl.
*H05K 7/20* (2006.01)
(52) U.S. Cl. ............... 361/679.33; 702/121; 369/44.53; 360/97.02; 73/865.6
(58) Field of Classification Search .................. 702/69, 702/121, 185; 369/44.11, 47.53; 73/862.541, 73/865.6; 360/71, 31, 92.1, 97.02; 361/679.31, 361/679.32, 679.33, 679.34, 679.35, 679.36, 361/679.37
See application file for complete search history.

(56) References Cited

U.S. PATENT DOCUMENTS

| 5,563,767 | A | 10/1996 | Chen |
| 5,708,633 | A * | 1/1998 | Hollen et al. ............ 369/44.11 |
| 5,979,249 | A * | 11/1999 | Koo et al. ............... 73/862.541 |
| 7,088,541 | B2 * | 8/2006 | Orriss et al. .................. 360/71 |
| 7,164,579 | B2 * | 1/2007 | Muncaster et al. ..... 361/679.33 |
| 2001/0001529 | A1 | 5/2001 | Behl |
| 2004/0114321 | A1 | 6/2004 | Roh |
| 2006/0085158 | A1 * | 4/2006 | Cakiner ..................... 702/121 |

FOREIGN PATENT DOCUMENTS

JP    2002-230701 A    8/2002

OTHER PUBLICATIONS

RD 408158 A Derwent Abstract Accession No. 98-259172/23 (IBM Corp) Apr. 10, 1998.
World Intellectual Property Organization, International Search Report for PCT/SG2005/000132.

* cited by examiner

*Primary Examiner*—Hung V Duong
(74) *Attorney, Agent, or Firm*—Intellectual Property Law Group LLP; Juneko Jackson; Otto O. Lee

(57) ABSTRACT

A test carrier 10 for storage devices 38 comprising a carrier base 12; a slider tray 16 slidably mounted to the carrier base 12, the slider tray 16 having at least one aperture for receiving a storage device 38 therein; at least one storage device connector 20 connected to the carrier base 12; and a tester interface 22, where, when the slider tray 16 is in a first position, the storage device 38 can be received within the at least one aperture of the slider tray 16 and, when the slider tray 16 is in a second position, an interface of the storage device 38 mates with the storage device connector 20; appropriate circuitry contained in the carrier base 12 connecting the tester interface 22 and the storage device connector 20 thereafter allowing the storage device 38 to be tested via the tester interface 22.

15 Claims, 4 Drawing Sheets

TEST CARRIERS FOR STORAGE DEVICES

FIELD OF THE INVENTION

The present invention relates to a test carrier for storage devices. The invention is particularly suited to testing one inch and sub-one inch storage devices, hereafter referred to as small-form-factor ("SFF") storage devices, in a 3.5" hard disk drive tester.

BACKGROUND ART

The following discussion of the background invention is intended to facilitate an understanding of the present invention. However, it should be appreciated that the discussion is not an acknowledgment or admission that any of the material referred to was published, known or part of the common general knowledge in any jurisdiction as at the priority date of the application.

In all manufacturing processes the product manufactured is subject to certain quality control requirements. In respect of products, this generally involves testing using one or more testing devices.

In the manufacture of storage devices, and in particular SFF storage devices, there are a number of problems that the manufacturer is presented with, such as:
- testing beds are typically designed for 3.5" storage devices. Testing beds of alternate sizes need to be custom made which delays the time to market of SFF storage devices.
- existing testing beds do not facilitate the quick connection and disconnection of the storage device to be tested.
- existing testing beds have limited clamping and damping features, if any. This affects the performance of the storage device under test.

It is an object of the present invention to overcome, or relieve at least in part, one or more of the above problems by providing a test carrier that can make use of existing 3.5"HDD testers to test storage devices of any size, including SFF storage devices.

DISCLOSURE OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

In accordance with a first aspect of the invention there is a test carrier for storage devices comprising:
- a carrier base;
- a slider tray slidably mounted to the carrier base, the slider tray having at least one aperture for receiving a storage device therein;
- at least one storage device connector connected to the carrier base; and
- a tester interface where, when the slider tray is in a first position, the storage device can be received within the at least one aperture of the slider tray and, when the slider tray is in a second position, an interface of the storage device mates with the storage device connector, appropriate circuitry contained in the carrier base connecting the tester interface and the storage device connector thereafter allowing the storage device to be tested via the tester interface.

The tester interface may be of any size or configuration. Ideally, however, the tester interface is a 3.5" HDD interface adapted to be received within a 3.5" HDD tester bed.

The storage device connector may also be of any size or configuration. Preferably, the storage device connector is adapted to allow mating with the appropriate interface of SFF storage devices such as Compact Flash and MMC storage devices. Preferably, the slider tray has dampening means connected thereto, the dampening means operable to provide mechanical dampening of the storage device during testing.

More preferably, the dampening means also operates to align the interface of the storage device within the storage device connector to facilitate the mating thereof.

More preferably, the dampening means may be removed. In this manner, dampening means that suit the storage device to be tested can be used rather than being restricted to using the one dampening means for each storage device. This also allows storage devices of varying sizes and configurations to be retained within the apertures of the slider tray.

More preferably, the dampening means includes an elastic pad dampener.

Still more preferably, the dampening means includes a wedge assembly.

Preferably, the carrier base further includes inbuilt testing circuitry connected to the tester interface, or connected directly to the storage device connector, as required to test the desired storage device.

Preferably, the carrier base has at least one slider guide mounted thereto, a portion of each slider guide adapted to be received between segments of the slider tray, such that movement of the slider tray is limited by the portion to the space between the first and second positions.

More preferably, at least one segment of the slider tray operates as a handle.

Preferably, the slider tray and carrier base each include retention means that operate conjunctively to releasably retain the slider tray in either the first position or the second position.

More preferably, the retention means of the slider tray is a clip mechanism and the retention means of the carrier base is an aperture adapted to receive a portion of the clip mechanism therein.

Preferably, the test carrier includes connector shields, the connector shields positioned so as to provide protection to the storage device connectors when the slider tray is in the first position.

BRIEF DESCRIPTION OF THE DRAWINGS

The present invention will now be described with reference to the following drawings, of which.

BEST MODE(S) FOR CARRYING OUT THE INVENTION

Figure 1:
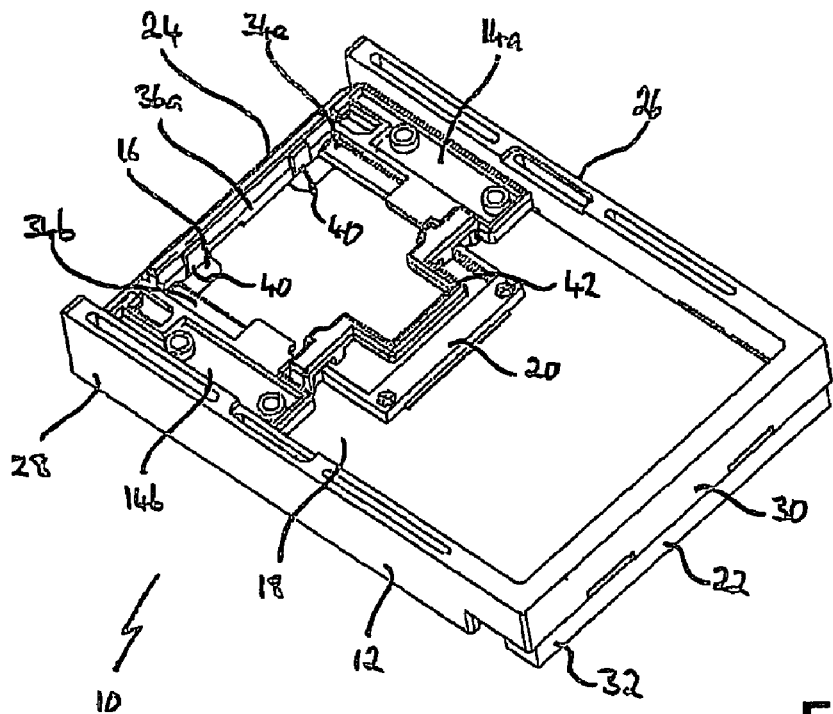
FIG. 1 is an isometric view of a test carrier unit according to a first embodiment of the invention.

In accordance with a first embodiment of the invention there is a single-unit test carrier 10 as shown in FIG. 1. The test carrier 10 comprises a carrier base 12, slider guides 14a, 14b, a slider tray 16, an interface PCBA 18, a storage device connector 20 and a tester/host interface PCBA 22.

Figure 2:
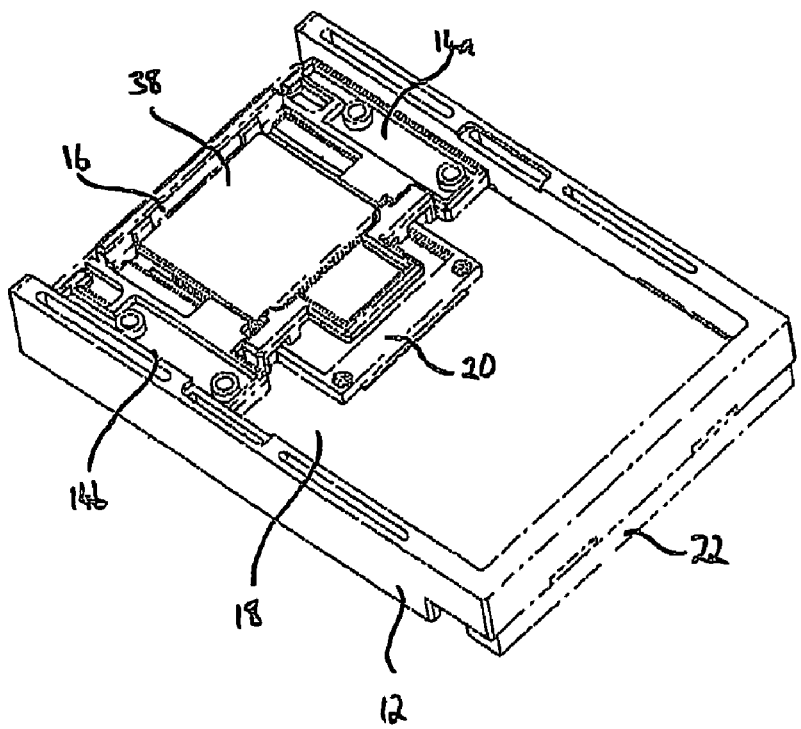
FIG. 2 is an isometric view of the test carrier of FIG. 1 with a slider tray in a first position.
Figure 3:
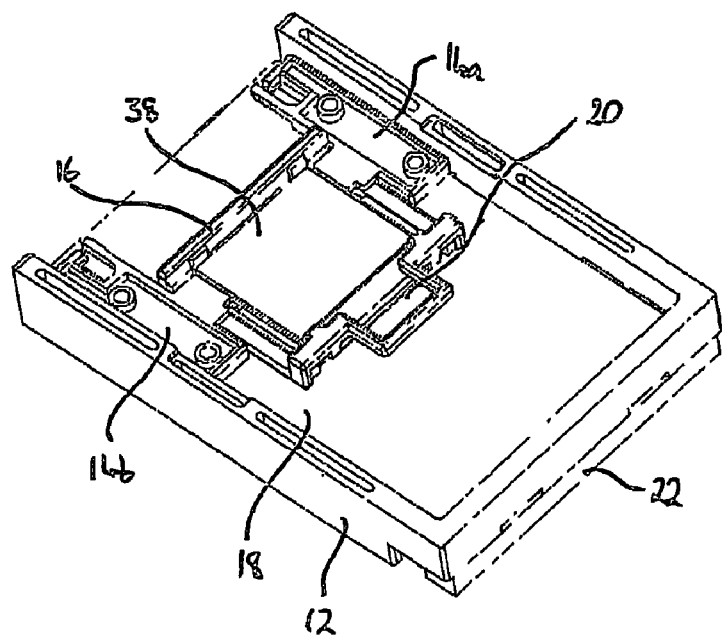
FIG. 3 is an isometric view of the test carrier of FIG. 1 with the slider tray in a second position.

Each slider guide 14 is mounted to the carrier base 12 at a first end 24. Slider guide 14a is mounted to the carrier base 12 at the first end 24 adjacent side wall 26. Slider guide 14b is mounted to the carrier base 12 at the first end 24 adjacent side wall 28. The slider tray 16 is positioned between the slider guides 14a, 14b and connected thereto in a manner that permits the slider tray 16 to move in the direction from first end 24 towards a second end 30. This is illustrated in FIGS. 2 and 3.

The interface PCBA 18 is mounted centrally on the carrier base 12. The interface PCBA 18 abuts slider guides 14a, 14b and extends between side wall 26 and side wall 28. Storage device connector 20 is mounted to the interface PCBA 18.

The tester/host interface PCBA 22 is also affixed to the carrier base 12. The tester/host interface PCBA 22 has a connector portion 32 designed to accommodate a 3.5" hard disk drive interface (eg. PATA, SATA or SCSI, etc.). The connector portion 32 is positioned at the second end 30. The carrier base 12 contains circuitry as would be known to the person skilled in the art to provide an appropriate connection between the tester/host interface PCBA 22 and the storage device connector 20. This circuitry must also be capable of handling the appropriate communication protocols as required by the type of connector portion 32 implemented.

The test carrier 10 will now be described in more detail in the context of the following example.

The slider tray 16 comprises slider rails 34 and connector struts 36. Each slider rail 34a, 34b is connected to a portion of its corresponding slider guide 14a, 14b, respectively.

Connector struts 36a, 36b connect the slider rails 34. Connector strut 36a connects the slider rails 34 at the end thereof near first end 24. Connector strut 36b connects the slider rails 34 at the end abutting interface PCBA 18. In each case, the connector strut 36 is of greater height than the slider rail 34 so as to keep the portion of the corresponding slider guide 14 contained therebetween.

Additionally, the space between connector struts 36 and the space between slider rails 34 should be such that a storage device 38 designed to be tested can be fitted securely therebetween as shown in FIG. 2.

FIG. 2 also shows the test carrier 10 with the slider tray 16 in a first position (referred to hereafter as the "unload position"). The storage device 38 designed to be tested is then retained within the space between the connector struts 36 and slider rails 34. Dampers 40, in the form of elastic pads mounted to connector strut 36a, provide mechanical damping to the storage device 38 when retained within the slider tray 16 and assists in securely retaining said storage device 38 within the slider tray 16.

Further, as the slider tray 16 is moved from the unload position to a second position (referred to hereafter as the "load position"), the dampers 40 assist in moving the storage device 38. At the same time, by having the portion of the slider guides 14 contained within the connector struts 36, the degree of movement of the slider tray 16 can be limited to an appropriate level.

FIG. 3 shows the test carrier 10 with the slider tray 16 in the load position. As is shown more clearly in this Figure, connector strut 36b is raised from the carrier base 12. In this manner, connector strut 36b can move over the top of storage device connector 20 as the slider tray 16 moves towards the load position.

To facilitate movement of the slider tray 16 from the load position to the unload position, and vice-versa, connector strut 36b includes a handle portion 42.

Similarly, FIG. 3 illustrates that the storage device connector 20 is positioned parallel to the connector struts 36 and is of a length that is equal to the space between the slider rails 34. In this manner, the interface of the storage device 38 to be tested can mate with the storage device connector 20 to create an appropriate interface.

With the storage device 38 mated with the storage device connector 20, the test carrier 10 can be inserted into a 3.5" HDD test bed (not shown) to test the storage device 38.

The advantage of this arrangement is that the insertion and removal of the storage device 38, and the movement of the slider tray 16 from the load position to the unload position, can be performed by way of a robotic arm. Thus the requirement for testing can form an automated part of the manufacturing process.

Figure 4:
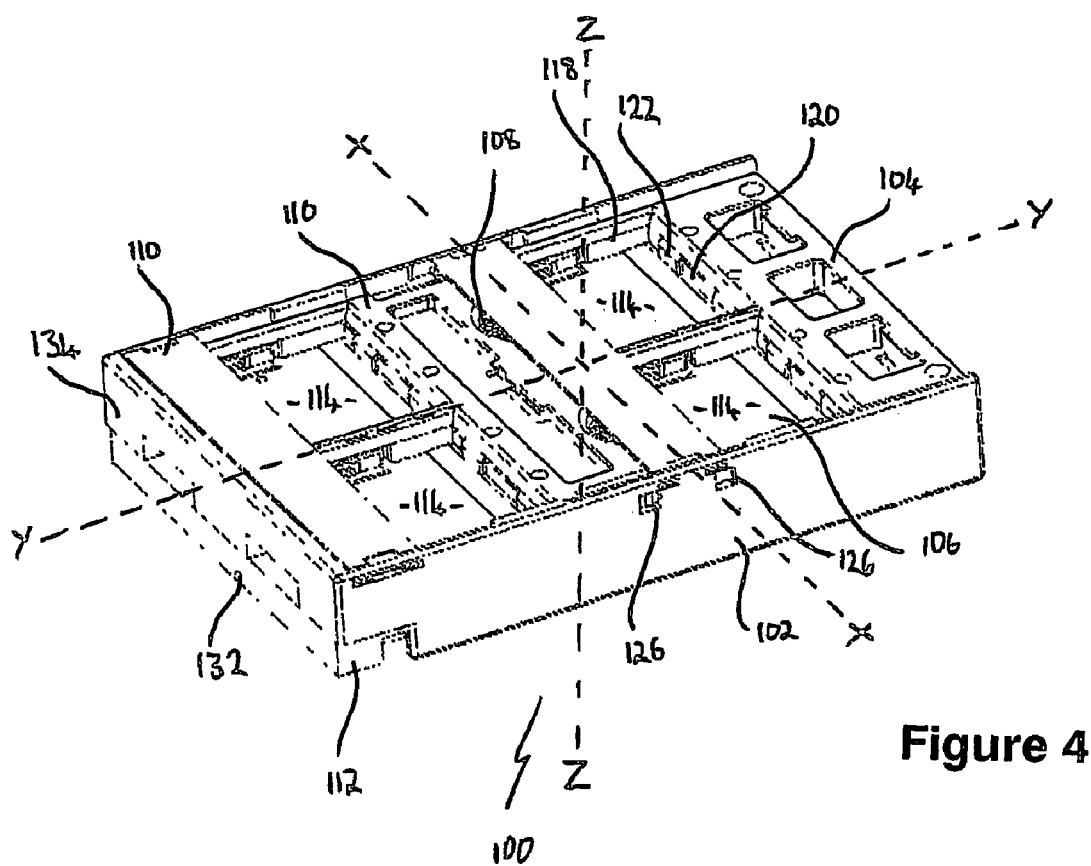
FIG. 4 is an isometric view of a test carrier unit according to a second embodiment of the invention.
Figure 5:
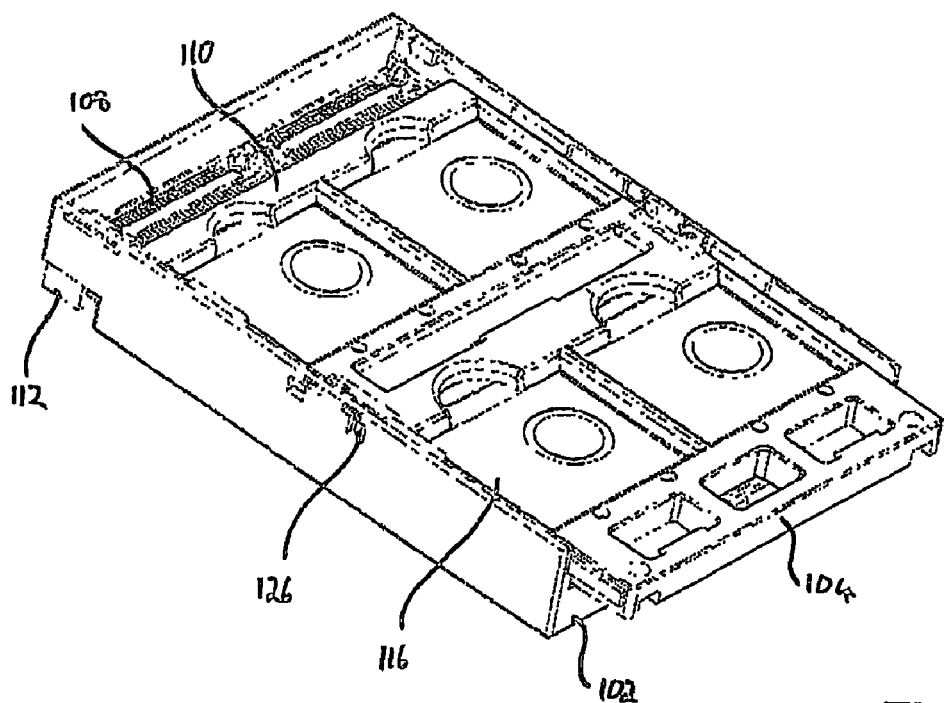
FIG. 5 is an isometric view of the test carrier of FIG. 4 with a slider tray in a first position.
Figure 6:
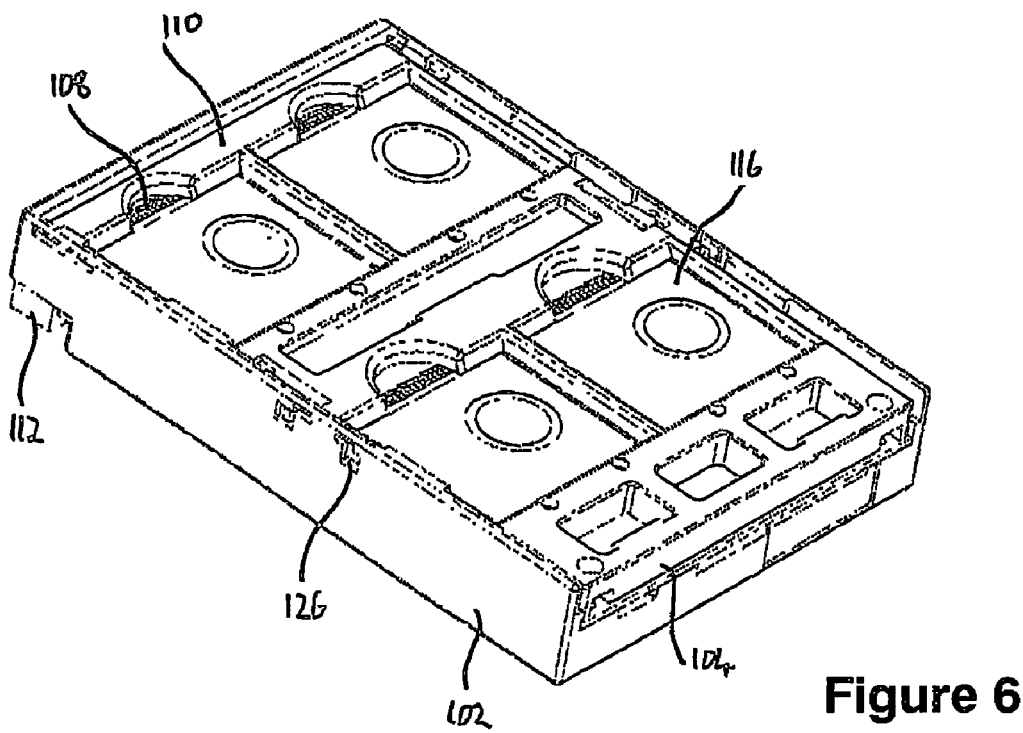
FIG. 6 is an isometric view of the test carrier of FIG. 4 with the slider tray in a second position.

In accordance with a second aspect of the present invention there is multi-unit test carrier 100 as shown in FIG. 4. The test carrier 100 comprises a carrier base 102, a slider tray 104, an interface PCBA 106, storage device connectors 108 and a tester/host interface PCBA 112.

The slider tray 104 is slidably mounted to the carrier base 102. The slider tray has four openings 114 therein each adapted to receive a storage device 116. Contained within each opening 114 are side guides 118, a wedge assembly 120 and dampeners 122 (again in the form of elastic pads). The side guides 118 align the storage device 116 contained within its respective opening 114 with a storage device connector 108. The combination of side guides 118, wedge assembly 120 and dampeners 122 operate to provide mechanical clamping and damping action to the storage device 116 as described in the next paragraph.

As the storage device 116 moves from the unload to the load position, the side guides 118 align the storage device 116 into side rails (not shown) of the storage device connector 108. The tapered surface of the wedge assembly 120 similarly pushes the storage device 116 upward against the side rails. The effect of these two actions is that the storage device 116 is securely clamped in the vertical axis Z. The dampeners 122 also push the storage device 116 against the storage device connector 108 which operates to securely clamp the storage device 116 in the horizontal axes X, Y.

These features may also be replaced as needed to accommodate the size and design of the storage device 116 to be tested. Further, by selecting a dampener 122 made of material of appropriate durometer, changes in dampening force can be achieved and an optimal dampening force determined.

As mentioned above, the slider tray 104 is slidably mounted to the carrier base 102. This mounting allows the slider tray 104 to move along the axis marked Y in FIG. 4 from a first position (referred to as the "load" position) to a second position (referred to as the "unload" position). To ensure that the slider tray 104 is securely retained at either the load or unload position, as required, the slider tray 104 has a clip mechanism 124 adapted to be retained within retaining apertures 126.

Figure 7:
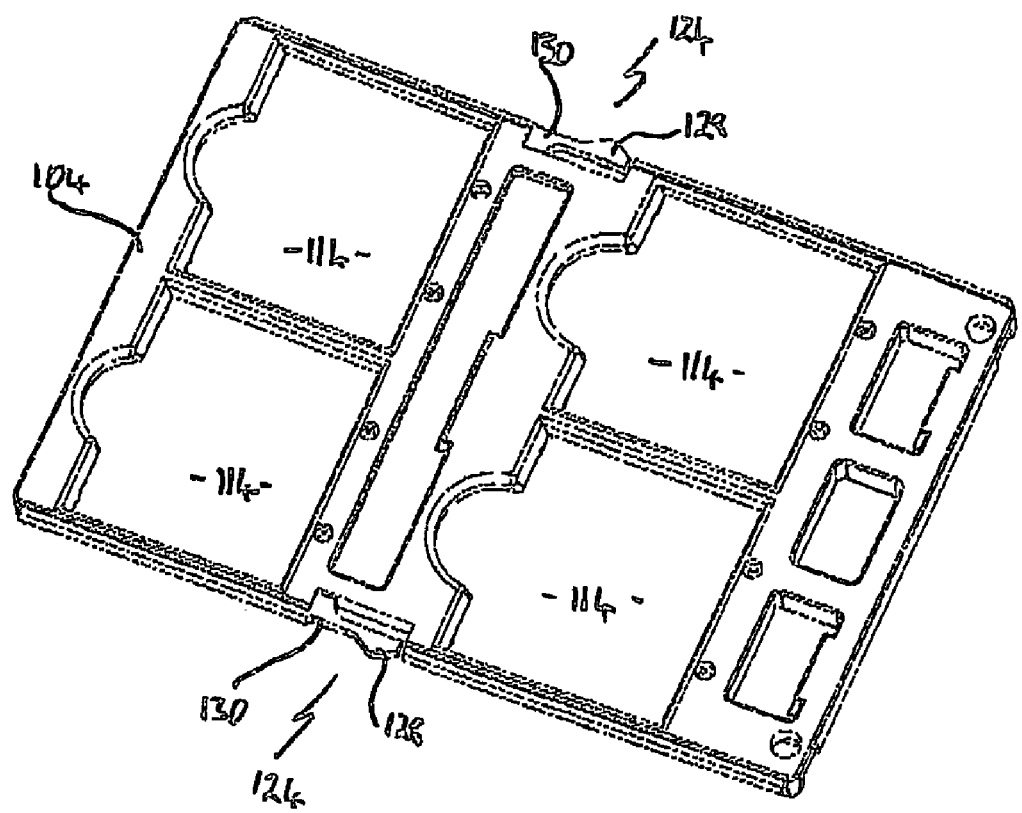
FIG. 7 is an isometric view of a slider tray of the test carrier of FIG. 4.

As mentioned, to achieve this secure retention, the slider tray 104 has a pair of clip mechanisms 124 as shown in FIG. 7. Each clip mechanism 124 comprises a retaining portion 128 and a spring arm 130. Each retaining portion 128 forms a head for its respective spring arm 130. Each spring arm 130 connects to the remainder of the slider tray 104.

The spring arms 130 are of the thin wall variety to allow for the required movement of the retaining portion 128 towards the remainder of the slider tray 104. The thickness and length of the spring arms 130 can be varied to achieve the desired retention force.

The side of the retaining portion 128 facing the carrier base 102 is tapered such that it enables the retaining portion 128 to move in and out of the retaining apertures 126 when the slider tray 104 moves between the unload and load positions.

Connector shields 110 are clipped to the carrier base 102. When clipped to the carrier base 102, the position of the connector shields 110 is such that the slider tray 104 is able to slide freely underneath. The connector shields 110 will be explained in more detail below.

Storage device connectors 108 are mounted to the carrier base 102. Each storage device connector 108 is positioned such that it is within an opening 114. Further, the position of the storage device connector 108 is such that when the slider tray 104 is retained in the unload position, the connector shields 110 protect the storage device connector 108 from damage, while when the slider tray 104 is retained in the load position, the storage device 116 is guided by the side guide 118 to mate with the storage device connector 108.

The tester/host interface PCBA 112 is also affixed to the carrier base 102. The tester/host interface PCBA 112 has a connector portion 132 designed to accommodate a 3.5" hard disk drive interface. The connector portion 132 is positioned at a first end 134. The carrier base 102 contains circuitry as would be known to the person skilled in the art to provide an appropriate connection between the tester/host interface PCBA 112 and the storage device connector 108. This circuitry must also be capable of handling the appropriate communication protocols as required by the type of connector portion 132 implemented.

The multi-unit test carrier 100 will now be described in the context of the following example.

A robotic arm (not shown) moves the slider tray 104 to the unload position. The same robotic arm then individually places four storage devices 116 in each of the openings 114 within the slider tray 104. Once placed in the openings, the robotic arm moves the slider tray 104 to the load position. This causes the storage devices 116 to mate with their respective storage device connector 108.

With the storage device 116 mated with the storage device connector 108, the test carrier 100 can be inserted into a 3.5" HDD test bed (not shown) to test the storage device 116.

It should be appreciated by the person skilled in the art that the invention is not limited to the embodiments described above. In particular, the following modifications may be made without departing from the scope of the invention:

1. The connector portions 32, 134 may be omitted in its place the circuitry required to effectively test the storage device may be built into the tester/host interface PCBA 22, 112.
2. The test carrier 10, 100 may be adapted to be used in HDD tester units having a test bed size greater than or less than the 3.5" HDD tester unit mentioned above.
3. The clip mechanism 124 may be replaced with other mechanisms by which the slider tray 104 may be securely retained in both the load and unload positions.
4. The slider tray 104 of the second embodiment may be modified to adapt to any number of SFF storage devices that can be fitted within the carrier base 102.

The claims defining the invention are as follows:

1. A test carrier for storage devices comprising:
   a carrier base;
   a slider tray slidably mounted to the carrier base, the slider tray having at least one aperture for receiving a storage device therein;
   at least one storage device connector connected to the carrier base; and
   a tester interface
   where, when the slider tray is in a first position, the storage device can be received within the at least one aperture of the slider tray and, when the slider tray is in a second position, an interface of the storage device mates with the storage device connector, appropriate circuitry contained in the carrier base connecting the tester interface and the storage device connector thereafter allowing the storage device to be tested via the tester interface.

2. A test carrier according to claim 1, where the tester interface is a 3.5" HDD interface adapted to be received within a 3.5" HDD tester bed.

3. A test carrier according to claims 1 or 2, where the storage device connector is adapted to allow mating with the appropriate interface of SFF storage devices.

4. A test carrier according to claim 3, where the SFF storage device is one of the following: Compact Flash; MultiMedia Card.

5. A test carrier according to claims 1 or 2, where the slider tray has dampening means connected thereto, the dampening means operable to provide mechanical dampening of the storage device during testing.

6. A test carrier according to claim 5, where the dampening means also operates to align the interface of the storage device within the storage device connector to facilitate the mating thereof.

7. A test carrier according to claim 5, where the dampening means is removable.

8. A test carrier according to claim 5, where the dampening means includes an elastic pad dampener.

9. A test carrier according to claims 5, where the dampening means includes a wedge assembly.

10. A test carrier according to claim 1, where the carrier base further includes inbuilt testing circuitry connected to the tester interface, or connected directly to the storage device connector, as required to test the desired storage device.

11. A test carrier according to claim 1, where the carrier base has at least one slider guide mounted thereto, a portion of each slider guide adapted to be received between segments of the slider tray, such that movement of the slider tray is limited by the portion to the space between the first and second positions.

12. A test carrier according to claim 1, where at least one segment of the slider tray operates as a handle.

13. A test carrier according to claim 1, where the slider tray and carrier base each include retention means that operate conjunctively to releasably retain the slider tray in either the first position or the second position.

14. A test carrier according to claim 13, where the retention means of the slider tray is a clip mechanism and the retention means of the carrier base is an aperture adapted to receive a portion of the clip mechanism therein.

15. A test carrier according to claim 1, further including connector shields, the connector shields positioned so as to provide protection to the storage device connectors when the slider tray is in the first position.

* * * * *